United States Patent
Shi et al.

(10) Patent No.: US 6,205,438 B1
(45) Date of Patent: Mar. 20, 2001

(54) CURRENT-TYPE FUZZY PROCESSOR

(75) Inventors: Bingxue Shi; Gu Lin, both of Beijing (CN)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/138,234

(22) Filed: Aug. 21, 1998

(51) Int. Cl.[7] ............................... G06F 15/18; G06E 1/00
(52) U.S. Cl. ....................................... 706/5; 706/1; 706/4
(58) Field of Search ........................................ 706/1, 3, 5

(56) References Cited

U.S. PATENT DOCUMENTS

| | | | |
|---|---|---|---|
| 4,694,418 | * 9/1987 | Ueno et al. | 706/3 |
| 5,295,226 | * 3/1994 | Yamakawa | 706/3 |
| 5,396,579 | * 3/1995 | Koji et al. | 706/5 |
| 5,706,497 | * 1/1998 | Takahashi et al. | 707/5 |
| 5,719,999 | * 2/1998 | Nishidai et al. | 706/3 |
| 5,799,291 | * 8/1998 | Eichfeld et al. | 706/1 |
| 5,802,204 | * 9/1998 | Basehore | 382/186 |
| 5,802,506 | * 10/1998 | Hutchison | 706/20 |
| 5,918,221 | * 6/1999 | Manaresi et al. | 706/9 |
| 6,038,556 | * 3/2000 | Hutchison | 706/25 |

OTHER PUBLICATIONS

Ramierz–Angulo, "Current–Mode and Voltage–Mode VLSI Fuzzy Processor Architecture," May 1995 IEEE International Symposium on Circuits and Systems, vol. 2, pp. 1156–1159.*

Chao–Lieh, "Fuzzy Hardware Synthesis with Generic LR Fuzzy Cells," Proceedings of the Second New Zealand International Two–Stream Conference on Artifical Neural Networks and Expert Systems, 1995, pp. 128–131, Nov. 1995.*

* cited by examiner

Primary Examiner—Mark Powell
Assistant Examiner—Michael Ponder
(74) Attorney, Agent, or Firm—Kolsich Hartwell Dickinson McCormack & Heuser

(57) ABSTRACT

A current-type fuzzy processor is disclosed. The fuzzy processor comprises a characteristic decoder for decoding a to-be-identified pattern, a plurality of membership function generators for generating a plurality of membership degrees for the to-be-identified pattern, a weighting decoder for generating a weighting value, a plurality of weighting adjustment circuits for performing weighting operations on the plurality of membership degrees according to the weighting value to generate a plurality of weighted membership degrees, a plurality of accumulators for performing accumulation operations on the plurality of weighted membership degrees to generate a plurality of synthesis membership degrees, a WTA circuit for outputting the plurality of synthesis membership degrees in an order of magnitude; and a timing and control logic for generating timing and control signals for the fuzzy processor.

8 Claims, 4 Drawing Sheets

CURRENT-TYPE FUZZY PROCESSOR

BACKGROUND OF THE INVENTION

1. Field of the Invention

The present invention relates to a fuzzy processor, more particularly, to a hybrid current-type fuzzy processor which is of high precision, suitable in many applications, and manufactured with low cost.

2. Description of Related Art

The idea of fuzzy logic was introduced by L. A. Zadeh in 1965, which plays an important role in the field of computer science and has been successfully applied in many applications. Fuzzy logic is commonly implemented in computer software. However, because software fuzzy logic can not satisfy many applications requiring real-time processing, a design of hardware fuzzy logic has become an important research approach.

Currently, two types of hardware fuzzy logic are provided, digital hardware fuzzy logic and analog hardware fuzzy logic. The digital hardware fuzzy logic is supported by lots of well-known digital VLSI technologies but it suffers a disadvantage in having complicated circuitry. In addition, because the inputs to fuzzy logic are usually analog signals, A/D and D/A converters are required for the digital hardware fuzzy logic, which makes the structure of the fuzzy logic more complicated. On the other hand, the analog hardware fuzzy logic is easy to implement due to the non-linear characteristic of the analog circuitry. Moreover, no A/D or D/A converter is required and thus the structure of the fuzzy logic is simple.

Generally, analog fuzzy logic is constructed by multi-value logic circuit units, which may be of a voltage type or a current type. For conventional voltage type circuits, operational amplifiers are required for summation or subtraction operations to voltages, which makes the circuit complicated. However, the current type circuit is capable of proceeding summation and subtraction operations to currents and thus simplifies the circuit. In addition, the operating speed of a current type circuit is generally higher than that of the voltage type circuit because the gain bandwidth of the operational amplifier restricts the operating speed of the voltage type circuit. Moreover, in a voltage type fuzzy logic circuit, switch capacitors are usually required, which increases the size of a chip for the circuit because a large chip area is required to fabricate a capacitor. The use of switch capacitors also increases the complexity of manufacturing a chip for the circuit as two polysilicon layers are required for fabricating a switch capacitor. However, the fabrication of a current switch for the current type fuzzy logic can be done by standard digital CMOS technology and thus reduce the complexity of manufacturing a chip for the circuit. Accordingly, the present invention provides a switch current type fuzzy processor for pattern recognition.

Because of the imprecise, vague and incomplete nature of available information about an object, people usually have to proceed in fuzzy inference and adjudgement, which forms the physical basis for the fuzzy mathematics applied in pattern identification. The principle rule of fuzzy pattern identification is the maximum membership degree rule. In the actual application, a standard pattern usually has a plurality of fuzzy features. If there are n standard patterns each having m fuzzy features and the jth fuzzy characteristic of the ith pattern is Aij, where i=1,2, ..., n; j=1,2, ..., m, then each standard pattern Ai is a fuzzy vector Ai=<Ai1, Ai2, ..., Aim>, $1 \leq i \leq n$. Assuming that $u=(u_1, u_2, \ldots, u_m)$ is a pattern to be identified, each member of u, that is each $u_j$, corresponds to a fuzzy characteristic. If there exists an i $\epsilon \{1,2, \ldots, n\}$ such that $\mu_{Ai}(u)=\max\{\mu_{A1}(u), \mu_{A2}(u), \ldots, \mu_{An}(u)\}$ then u relatively belongs to Ai, wherein it is assumed that $\mu_{Ai}(u)=M_m(\mu_{Ai1(u1)}, \mu_{Ai2(u2)}, \ldots, \mu_{Aim}(u_m))$ and $M_m()$ is a synthesis function.

There are many choices for the synthesis functions. The most frequently used are the minimum-finding function, $\Lambda_j(X)=\Lambda_j x_j$ for j=1 to m, and the weighting summation function, $\Sigma X = \Sigma \alpha_j x_j$ for j=1 to m. The minimum-finding finding function is not suitable for pattern identification since it only emphasizes a local characteristic and neglects the other features. The weighting summation function is able to emphasize a local characteristic by adjusting the weighting factor $\alpha_j$ while not neglecting the other features whereby it is suitable for pattern identification. Therefore, the weighting summation function is adopted by the fuzzy processor in accordance with the present invention. Meanwhile, to enhance the ability of self-adjustment thereby increasing the application fields, the weighting factors of the synthesis function is designed to be adjustable.

SUMMARY OF THE INVENTION

The general objective of the present invention is to provide a current-type fuzzy processor for pattern identification, which is of high precision, suitable in many applications, and manufactured with low cost. To attain this, the fuzzy processor comprises a characteristic decoder for decoding a to-be-identified pattern, a plurality of membership function generators for generating a plurality of membership degrees for the to-be-identified pattern, a weighting decoder for generating a weighting value, a plurality of weighting adjustment circuits for performing weighting operations on the plurality of membership degrees according to the weighting value to generate a plurality of weighted membership degrees, a plurality of accumulators for performing accumulation operations on the plurality of weighted membership degrees to generate a plurality of synthesis membership degrees, a winner-take-all circuit for outputting the plurality of synthesis membership degrees in an order of magnitude; and a timing and control logic for generating timing and control signals for the fuzzy processor.

Other objects, advantages, and novel features of the invention will become more apparent from the following detailed description when taken in conjunction with the accompanying drawings.

DETAILED DESCRIPTION OF PREFERRED EMBODIMENT

Figure 1:
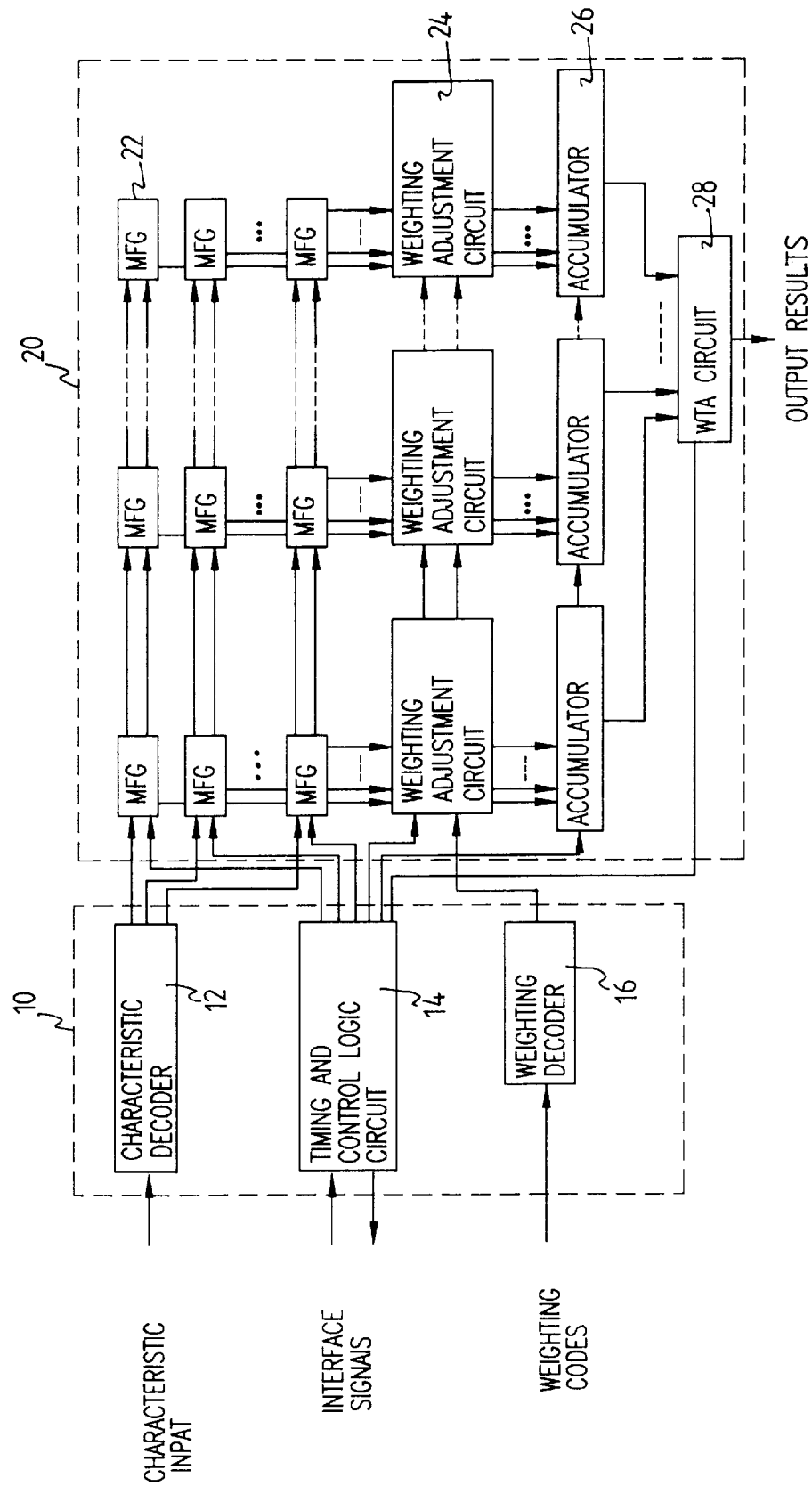
FIG. 1 is a block diagram of a fuzzy processor in accordance with the present invention.
Figure 2:
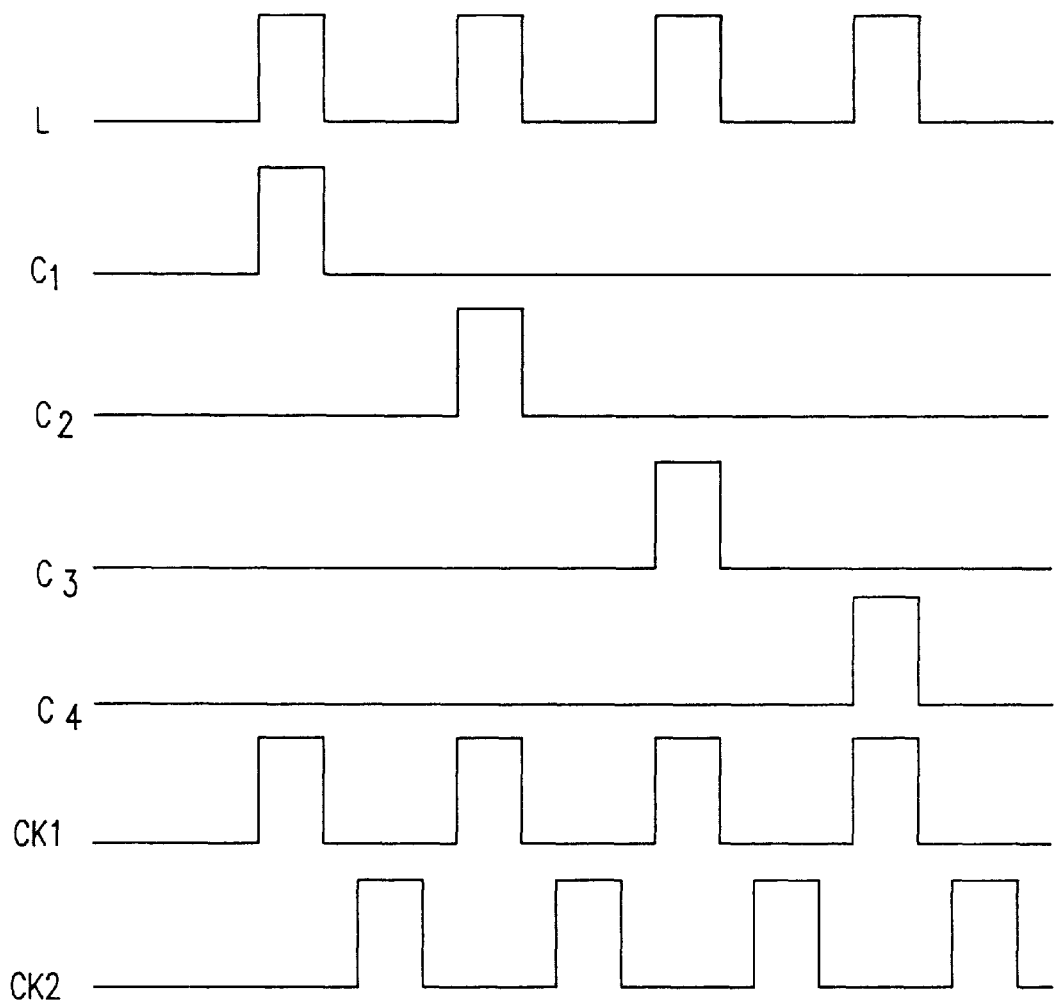
FIG. 2 is a timing diagram for the fuzzy processor in accordance with the present invention.

Referring to FIG. 1, a hybrid current-type fuzzy processor is given, which comprises a digital circuit 10 and an analog circuit 20. The digital circuit 10 comprises a characteristic decoder 12, a timing and control logic circuit 14 and a weighting decoder 16. The analog circuit 20 comprises a plurality of membership function generators 22, weighting adjustment circuits 24, accumulators 26 and a WTA (winner-take-all) circuit 28. For convenience, it is assumed that the fuzzy processor is operating with n standard patterns each having m features (n, m are natural numbers). Thus there are n×m membership function generators 22 each designated by a MFG where $MFG_{ij}(1 \leq i \leq n, 1 \leq j \leq m)$ corresponds to the jth characteristic of the ith standard pattern. The digital circuit 10 is utilized for decoding input codes and generating timing and control signals for the fuzzy processor. The analog circuit 20 is utilized for processing fuzzy data and outputting identified results. FIG. 2 gives a timing diagram for the fuzzy processor.

To identify a pattern, its corresponding features are input to the characteristic decoder 12. Assuming that a characteristic is of a k-digit binary code and thus there are $2^k$ possible characteristic values for one characteristic. In order to reduce the number of pins on a fuzzy processor chip and to share one characteristic decoder 12, the plurality of features of the pattern to be identified are input to the characteristic decoder 12 in a time shared manner under the control of a signal L shown in FIG. 2 by taking k=5 and m=4 for example. When the fuzzy processor is started, the first characteristic of the pattern to be identified is first input to the characteristic decoder 12 for decoding. The outputs of the characteristic decoder 12 are sent to the membership function generators 22 to generate membership degrees of the input characteristic corresponding to n standard patterns respectively. The other features are sequentially input and processed in the same manner. At the same time, a p-digit weighting code is input to and decoded by the weighting decoder 16 to generate a weighting value. The plurality of weighting adjustment circuits 24 select a set of weighting coefficients according to the weighting value output from the weighting decoder 16 for performing weighting operations on the membership degrees from different membership function generators 22 to generate weighted membership degrees. Each accumulator 26 receives the weighted membership degrees from one of the plurality of weighting adjustment circuits for performing accumulation operations and generates a corresponding synthesis membership degree. Finally, a winner-take-all circuit 28 receives all the synthesis membership degrees and outputs them in an order of magnitude for processing absolute identification-rejection judgments and relative identification-rejection judgments.

Figure 3:
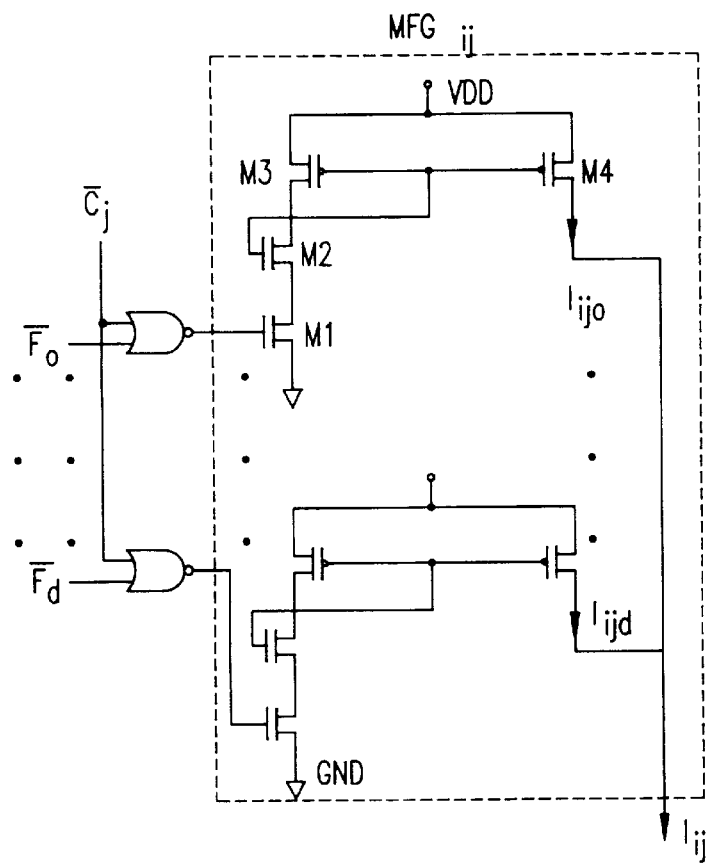
FIG. 3 is a circuit diagram of a membership function generator of the fuzzy processor.

Referring to FIG. 3, the circuit diagram of a membership function generator 22 is given. The $I_{ij}(1 \leq i \leq n, 1 \leq j \leq m)$ stands for the value of a membership degree corresponding to the jth characteristic of the ith standard pattern. The $I_{ij}$ is obtained from $I_{ijh}$ where $I_{ijh}(0 \leq h \leq d, d=2^k-1)$ designates the value of a membership degree of the hth characteristic value corresponding to the jth characteristic of the ith standard pattern. The membership function generator 22 is designed by a ratio current mirror technique. For example, M3 and M4 constitute a ratio current mirror and different ratios of shapes between M3 and M4 generate different output currents, which correspond to different values of membership degrees. $M_1$ as well as its corresponding NMOS transistors is designed to simulate a switch transistor which is controlled by the output $F_h(0 \leq h \leq d, d=2^k-1)$ of the characteristic decoder and a timing signal $C_j(1 \leq j \leq m, m=4)$ wherein $C_j(1 \leq j \leq m)$ are four adjacent but non-overlapped pulses, each corresponding to an input characteristic. In FIG. 3, $\sim C_j(1 \leq j \leq m)$ are the inverse signals of $C_j$ and $\sim F_h (0 \leq h \leq d, d=2^k-1)$ are the inverse signals of $F_h$.

Figure 4:
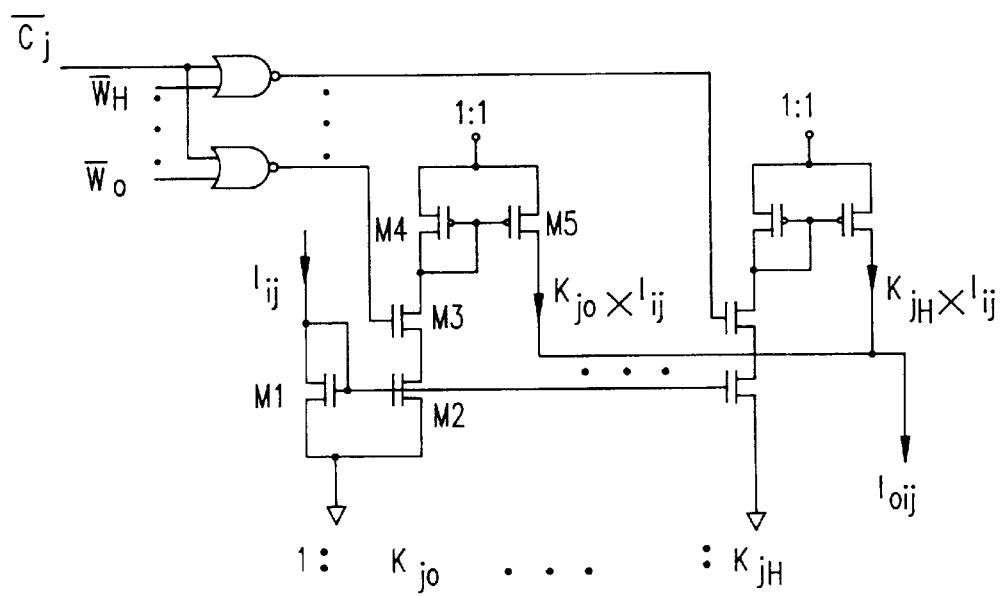
FIG. 4 is a circuit diagram of a weighting adjustment circuit of the fuzzy processor.

FIG. 4 is a circuit diagram of a weighting adjustment circuit 24 that is also designed with the ratio current mirror technique. The values of weighting coefficients are obtained by setting the ratio of shape between associated mirror transistors such as transistor M1 and transistor M2. Each of the transistor M3 and its corresponding NMOS transistors is designed to simulate a switch transistor. Different weighting coefficient sets are selected by turning on different switch transistors. These switch transistors are controlled by the timing signal $\sim C_j(1 \leq j \leq m, m=4)$ and the output $W_h(0 \leq h \leq H, H=2^p-1)$ of the weighting decoder 16 where p is the number of digits of the input weighting code. In addition, $\sim W_h$ is the inverse signal of $W_h$; $I_{ij}(1 \leq i \leq n, 1 \leq j \leq m, m=4)$ is a membership degree value of jth characteristic of ith standard pattern; and the output current $I_{oij}$ is the value of the weighted membership degree corresponding to $I_{ij}$.

Figure 5:
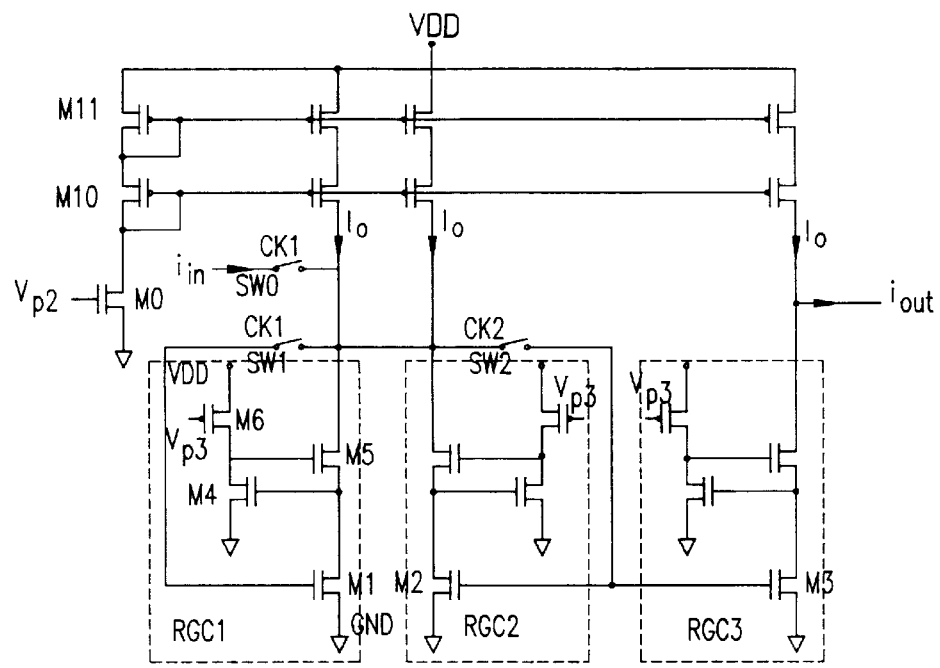
FIG. 5 is a is a circuit diagram of an accumulator of the fuzzy processor.

FIG. 5 is the circuit diagram of the current-type accumulator 26 which is the kernel of the fuzzy processor. The accumulator 26 performs an accumulation operation on the current-type values of weighted membership degrees to obtain the current-type value of a synthesis membership. The accumulator 26 is implemented by a switched-current technique which introduces the second generation switched-current storage to overcome disadvantages of the first generation switched-current storage. To stabilize the drain voltage of a storage transistor, a RGC (Regulated-Gate Cascade) structure is adopted to construct a storage unit such as the RGC1, RGC2 or RGC3 unit shown in FIG. 5. The corresponding transistors of the three RGC units are the same in size. In addition, the SW0, SW1 and SW2 are switches controlled by two non-overlapped clocks CK1 and CK2 shown in FIG. 2. The M10 and M11 and the corresponding mirror transistors constitute a current mirror for providing offset currents $I_0$ to the RGC units. Furthermore, assuming that $i_{in}$ is the input current and $i_{out}$ is the output current, the z-transform function between $i_{in}$ and $i_{out}$ can be derived as $i_{out} = i_{in} \times z^{-1}/(1-z^{-1})$. From this z-transform function, it is known that the accumulator 26 is capable of performing an accumulation operation because of having an integral characteristic.

Figure 6:
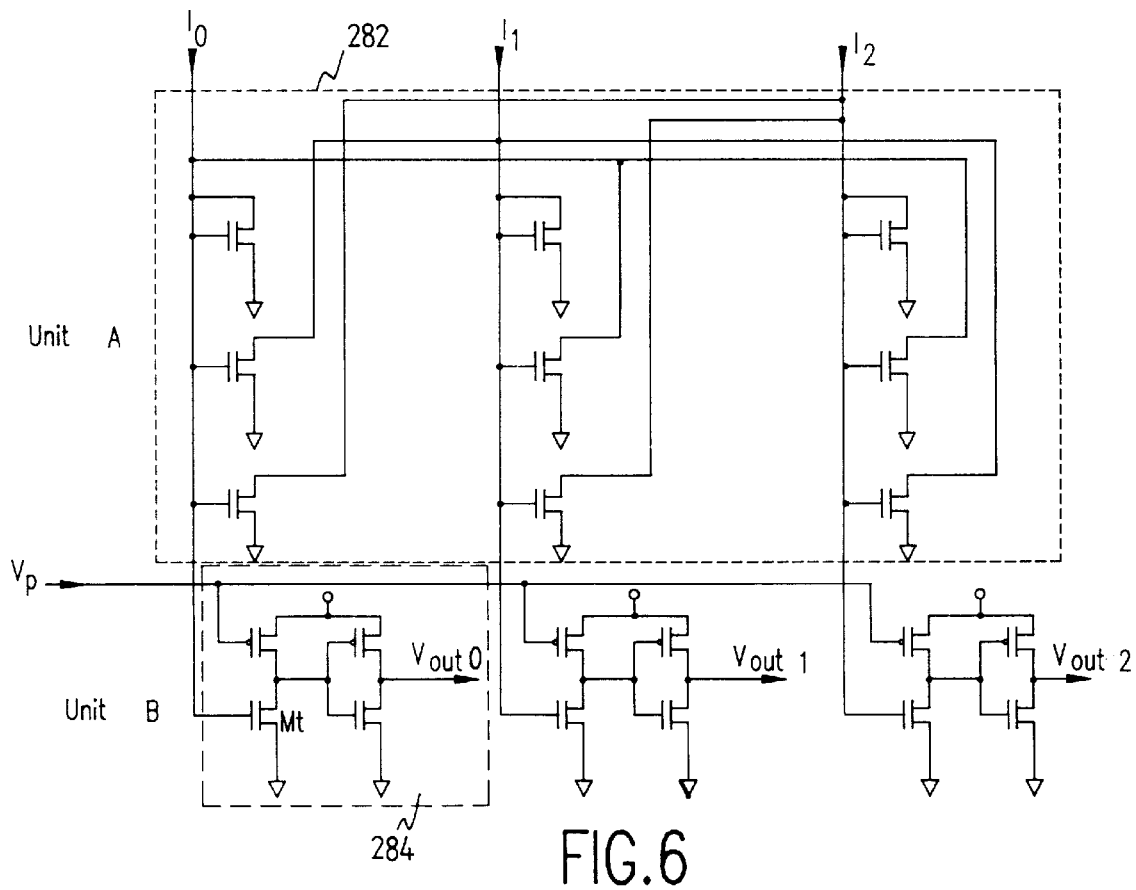
FIG. 6 is a is a circuit diagram of a three-input winner-take-all circuit of the fuzzy processor.

The WTA circuit 28 of the fuzzy processor is shown in FIG. 6 which comprises a circuit unit A 282 and a circuit unit B 284. The circuit unit A 282 is a fully symmetrical three-input WTA maximum-finding circuit network in which all of the NMOS transistors are of the same size. This WTA circuit network is a side-restrained interconnection network with both a high precision and a high speed, and an input terminal with a maximum current absorbs the currents from all other input terminals by mutual restrained operations among the input terminals such that the voltage level at the terminal corresponding to the input terminal with the maximum current becomes high while the voltage levels at the other terminals are restrained to become low. The circuit unit B 284 is a non-linear transform circuit for transforming the gate voltage of $M_t$ to a low voltage level for outputting from $Vout_0$ if the gate voltage of $M_t$ is smaller than a predetermined threshold value, and transforms the gate voltage of $M_t$ to a high voltage level for outputting from $Vout_0$ if the gate voltage of $M_t$ is larger than the threshold value. The threshold value is adjusted by an external bias voltage $V_p$. The output currents $i_{out}$ from all accumulators 26 are input to the WTA circuit unit whereby the voltage level at the output terminal corresponding to the input terminal with the maximum current is high and the voltage levels at the other output terminals are low.

As the accumulator 26 is the kernel of the fuzzy processor in accordance with the present invention, a test is made to the accumulator for evaluating its performance. The accumulator 26 for test is fabricated using 2 μm N-well standard digital CMOS technology with a single metal layer and a single polysilicon layer. In the test, $I_{ini}$(i=0,1,2,3) designates the ith input current and $I_{out}$ is the final accumulation current. Table 1 gives the test results for three input cases wherein ϵ is the final accumulation error. The test shows that the final accumulation error of the accumulator 26 is below 10 μA, indicating that the accumulator performs well and satisfies the requirement of a fuzzy processor.

TABLE 1

(Unit: μA)

| Simulation result | $I_{in0}$ | $I_{in1}$ | $I_{in2}$ | $I_{in3}$ | $I_{out}$ | ϵ |
| --- | --- | --- | --- | --- | --- | --- |
| 1 | 50 | 50 | 50 | 50 | 207 | 7 |
| 2 | 40 | 40 | 40 | 40 | 165 | 5 |
| 3 | 30 | 30 | 30 | 30 | 125 | 5 |

Although the present invention has been explained in relation to its preferred embodiment, it is to be understood that many other possible modifications and variations can be made without departing from the spirit and scope of the invention as hereinafter claimed.

What is claimed is:

1. A fuzzy processor for operating with a plurality of standard patterns each having a plurality of features, said fuzzy processor comprising:

a characteristic decoder for receiving a to-be-identified pattern having a plurality of input features, and generating a plurality of characteristic values corresponding to said plurality of input features respectively;

a plurality of membership function generators respectively corresponding to each one of said plurality of features of each one of said plurality of features of each one of said plurality of characteristic values to generate a plurality of characteristic values to generate a plurality of membership degrees respectively for each one of said plurality of input features corresponding to each one of said plurality of standard patterns;

a weighting decoder for receiving a weighting code and generating a weighting value;

a plurality of weighting adjustment circuits for receiving the membership degrees from different membership function generators and performing weighting operations on said received membership degrees according to said weighting value to generate weighted membership degrees;

a plurality of accumulators, each receiving the weighted membership degrees from one of said plurality of weighting adjustment circuits for performing accumulation operations to generate a synthesis membership degree;

a winner-take-all circuit for receiving the synthesis membership degrees from said plurality of accumulators and outputting said synthesis membership degrees in an order of magnitude; and a timing and control logic for generating timing and control signals for said fuzzy processor, wherein each one of said plurality of membership function generators comprises a plurality of current mirrors and a plurality of switch transistors for generating a current representing one of said plurality of membership degrees.

2. The fuzzy processor as claimed in claim 1, wherein said weighting adjustment means comprises a plurality of weighting adjustment circuits, each comprising a plurality of current mirrors and a plurality of switch transistors for generating weighting coefficients by selectively turning on said switch transistors.

3. The fuzzy processor as claimed in claim 2, wherein each one of said plurality of accumulators comprises a plurality of storage units constructed by a Regulated-Gate Cascade structure.

4. The fuzzy processor as claimed in claim 3, wherein said winner-take-all circuit is a side-restrained interconnection network whereby an input terminal thereof with a maximum current absorbs currents from all other input terminals thereof by mutual restrained operations among said input terminals.

5. A fuzzy processor for operating with a plurality of standard patterns each having a plurality of features, said fuzzy processor comprising:

a characteristic decoder for receiving a to-be-identified pattern having a plurality of input features, and generating a plurality of characteristic values corresponding to said plurality of input features respectively;

a membership function generating means for receiving of said plurality of characteristic values to generate a plurality of membership degrees respectively for each one of said plurality of input features corresponding to each one of said plurality of standard patterns;

a weighting decoder for receiving a weighting code and generating a weighting value;

a weighting adjustment for receiving said plurality of membership degrees and performing weighting operations on said received plurality of membership degrees according to said weighting value to generate a plurality of weighted membership degrees;

an accumulation means for receiving said plurality of weighted membership degrees and performing accumulation operations to generate a plurality of synthesis membership degree;

a winner-take-all circuit for receiving said plurality of synthesis membership degrees and outputting the same in an order of magnitude; and a timing and control logic for generating timing and control signals for said fuzzy processor, wherein said membership function generating means comprises a plurality of membership function generators, each comprising a plurality of current mirrors and a plurality of switch transistors for generating a current representing one of said plurality of membership degrees.

6. The fuzzy processor as claimed in claim 5, wherein said weighting adjustment means comprises a plurality of weighting adjustment circuits, each comprising a plurality of current mirrors and a plurality of switch transistors for generating weighting coefficients by turning on said switch transistors.

7. The fuzzy processor as claimed in claim 6, wherein said accumulation means comprises a plurality of accumulators, each comprising a plurality of storage units constructed by a Regulated-Gate Cascade structure.

8. The fuzzy processor as claimed in claim 7, wherein said winner-take-all circuit is a side-restrained interconnection network whereby an input terminal thereof with a maximum current absorbs currents from all other input terminals thereof by mutual restrained operations among said input terminals.

* * * * *